United States Patent
Steiner et al.

(10) Patent No.: US 11,136,219 B2
(45) Date of Patent: Oct. 5, 2021

(54) CONNECTING DEVICE AND METHOD FOR CONNECTING A WALL ELEMENT IN AN ELEVATOR CAR

(71) Applicant: Inventio AG, Hergiswil (CH)

(72) Inventors: Adrian Steiner, Inwil (CH);
Alessandro D'Apice, Ebikon (CH);
Oliver Notter, Horw (CH); Simon Ottiger, Hergiswil (CH)

(73) Assignee: INVENTIO AG, Hergiswil NW (CH)

( * ) Notice: Subject to any disclaimer, the term of this patent is extended or adjusted under 35 U.S.C. 154(b) by 320 days.

(21) Appl. No.: 16/345,265

(22) PCT Filed: Nov. 29, 2017

(86) PCT No.: PCT/EP2017/080752
§ 371 (c)(1),
(2) Date: Apr. 26, 2019

(87) PCT Pub. No.: WO2018/099939
PCT Pub. Date: Jun. 7, 2018

(65) Prior Publication Data
US 2019/0292016 A1    Sep. 26, 2019

(30) Foreign Application Priority Data
Nov. 29, 2016   (EP) .................................... 16201274

(51) Int. Cl.
*B66B 11/02*    (2006.01)
*F16B 5/02*    (2006.01)

(52) U.S. Cl.
CPC ...... *B66B 11/0253* (2013.01); *B66B 11/0226* (2013.01); *F16B 5/02* (2013.01)

(58) Field of Classification Search
CPC ..... B66B 11/0253; B66B 11/0226; F16B 5/02
See application file for complete search history.

(56) References Cited

U.S. PATENT DOCUMENTS

| 3,034,184 | A | * | 5/1962 | Lindstrom | ...................... 52/508 |
| 3,485,001 | A | * | 12/1969 | Miller | ...................... E04B 2/76 |
|  |  |  |  |  | 52/281 |
| 3,603,054 | A | * | 9/1971 | Didry | ...................... B65D 7/24 |
|  |  |  |  |  | 52/282.1 |

(Continued)

FOREIGN PATENT DOCUMENTS

| CN | 1248217 A | 3/2000 |
| CN | 201512335 U | 6/2010 |

(Continued)

*Primary Examiner* — Michael A Riegelman
(74) *Attorney, Agent, or Firm* — William J. Clemens; Shumaker, Loop & Kendrick, LLP

(57) ABSTRACT

An elevator car has a connecting device and at least one wall element, wherein the connecting device connects the at least one wall element with a bare ceiling of the elevator car. The connecting device includes a rail element with two legs, of which a first leg bears in the mounted state against the bare ceiling and a second leg has a mounting surface for the at least one wall element. The mounting surface has a first hole for suspending the at least one wall element. The at least one wall element has a suspension element at an edge which faces upwardly in the mounted state for engaging into the first hole of the connecting device.

13 Claims, 10 Drawing Sheets

(56) References Cited

U.S. PATENT DOCUMENTS

| | | | | |
|---|---|---|---|---|
| 4,199,907 | A * | 4/1980 | Bains | B66B 11/0253 52/122.1 |
| 4,251,969 | A * | 2/1981 | Bains | B66B 11/0253 52/584.1 |
| 4,357,993 | A * | 11/1982 | Halpern | B66B 11/0253 187/401 |
| 4,394,809 | A * | 7/1983 | Sherwood | E04C 2/08 52/269 |
| 4,462,193 | A * | 7/1984 | Ericson | B66B 11/0253 24/306 |
| 4,477,201 | A * | 10/1984 | Yoshiyuji | F16B 12/02 403/205 |
| 4,635,756 | A * | 1/1987 | Sherwood | B66B 11/0253 187/401 |
| 5,361,556 | A * | 11/1994 | Menchetti | E04B 2/7453 52/271 |
| 6,082,501 | A * | 7/2000 | Lehmann | B66B 11/0253 187/401 |
| 6,209,686 | B1 * | 4/2001 | Tomasetti | B66B 11/0206 187/401 |
| 6,250,033 | B1 * | 6/2001 | Zelinsky | E04B 2/8652 52/268 |
| 7,219,477 | B2 * | 5/2007 | Leffler | E04F 13/00 52/277 |
| 8,141,683 | B1 * | 3/2012 | Wurth | B66B 19/00 182/223 |
| 10,421,641 | B2 * | 9/2019 | Manner | B66B 11/024 |
| 2004/0195049 | A1 * | 10/2004 | Stobo | B66B 11/0253 187/401 |
| 2009/0272055 | A1 * | 11/2009 | Griffiths | E04F 13/081 52/309.3 |
| 2011/0100763 | A1 * | 5/2011 | Wiacek | B66B 11/0253 187/401 |
| 2014/0231183 | A1 * | 8/2014 | Halonen | E04B 1/6141 187/334 |
| 2015/0175388 | A1 * | 6/2015 | Klappholz | B66B 11/0226 187/401 |
| 2017/0144863 | A1 * | 5/2017 | Minami | B66B 11/0253 |
| 2017/0355566 | A1 * | 12/2017 | Miller | F16M 13/02 |
| 2018/0111797 | A1 * | 4/2018 | Fauconnet | B66B 11/0206 |
| 2019/0292016 | A1 * | 9/2019 | Steiner | F16B 5/02 |
| 2020/0048044 | A1 * | 2/2020 | Hagawane | F16B 12/28 |
| 2020/0207585 | A1 * | 7/2020 | Gettling | B66B 11/0253 |

FOREIGN PATENT DOCUMENTS

| | | |
|---|---|---|
| CN | 103030051 A | 4/2013 |
| CN | 203095351 U | 7/2013 |
| CN | 204607322 U | 9/2015 |
| ES | 2394510 A1 | 2/2013 |
| FR | 2650638 A1 | 2/1991 |
| FR | 2721074 A1 | 12/1995 |
| GB | 2139183 A | 11/1984 |
| KR | 101155394 B1 | 6/2012 |
| WO | 2018099939 A3 | 6/2018 |

* cited by examiner

CONNECTING DEVICE AND METHOD FOR CONNECTING A WALL ELEMENT IN AN ELEVATOR CAR

FIELD

The present invention relates to a connecting device for connecting a wall element with a bare ceiling of an elevator car, a wall element, a wall element arrangement having such connecting devices and wall elements, an elevator car with such connecting devices and/or wall elements, as well as a method for connecting such wall elements with the shell of an elevator car. The wall elements form the wall paneling of the elevator car that is visible to the passengers from the interior.

BACKGROUND

It is known to provide the shell of elevator cars with wall elements for interior paneling and for decorative purposes, wherein the shell defines a base structure for forming a generally cuboid car body. This shell of the elevator car comprising the bare ceiling, the subfloor and, as appropriate, the bare walls, is typically finished in a frame construction, for example of steel or of a light metal. In a marginal case, the shell of the car has no flat elements and the bare ceiling is only made of one frame.

The openings of the frame construction and the frame construction are covered with flat wall or ceiling elements. The wall and ceiling elements typically provide for an ap-pealing visual style of the interior of the elevator car and in some cases can even cooperate for the stabilization of the elevator car.

It is known to fasten the wall elements from the exterior of the bare walls, for example using screws.

It is preferred that the wall elements are mounted as late as possible so that the wall elements must be inserted through the shaft door. If necessary, they are also again removed from the elevator shaft. To do this, it is advantageous if the wall elements are mountable and, as necessary, demountable from the interior of the shell located in the elevator shaft. The wall elements can, for example, be glued to the bare walls, in particular to the frame construction. It is further also known to equip a bare wall that is to be covered with a wall element with corresponding fastening means, for example with an anchoring, as is disclosed in FR2650638, with clips for suspending a wall element, as are shown in U.S. Pat. No. 4,394,809, or with a bracket, as ES2394510 shows them. The bare wall can also have holes for suspending clips that are provided on a wall element, as is disclosed, for example, in GB2139183. For mounting, a counterpart provided on the wall element must always be brought into functional connection with the fastening means attached to the bare wall or with the hole provided in the bare wall. The counterpart is located on the side of the wall element facing the bare wall and is, therefore, typically not visible for the installer, which can complicate the mounting.

Connection brackets can be used to mount wall and ceiling elements of an elevator car, as are disclosed in US 2004/0195049, for example. The fastening typically is carried out with screws that must be secured from the outside of the car.

FR 2 721 074 discloses alternative connecting elements. Locking units with two pivots can be used as latching elements that can each be inserted in openings of angled lateral sections of a ceiling and a wall element. Nevertheless, the locking elements must also be locked from the outside of the car.

SUMMARY

It is therefore an object of the present invention to present an elevator car and a method designed for the connection which avoid the disadvantages of the known ones, and in particular allow a simple and quick mounting and a quick exchange of wall elements.

The object is achieved by an elevator car with a bare ceiling, at least one wall element and a connecting device for connecting the wall element with the bare ceiling of the elevator car. The connecting device comprises at least one rail element with two legs, of which a first leg bears in the mounted state against the bare ceiling and a second leg comprises at least one mounting surface for at least one wall element. The wall elements can be arranged interiorly on the bare walls and form the wall paneling of the elevator car that is visible for the passengers from the interior.

The mounting surface in the mounted state of the connecting device is preferably aligned parallel to the bare wall of the elevator car that is to be covered by the wall element.

A wall element or a plurality of wall elements that are arranged next to each other can be attached to the mounting surface.

The first leg and the second leg preferably enclose an angle of 90 degrees. In the mounted state, the first leg, in particular, faces away from the bare wall that is to be covered.

The connecting device can thus be attached without measuring means, for example a spirit level, and nonetheless provides that the wall elements after mounting are aligned as desired with respect to the shell and/or the other wall elements. The bare ceiling and the bare walls serve for orientation during the mounting of the connecting device.

A connecting device can comprise one rail element per bare wall to be covered and/or per wall element to be mounted or a plurality of rail elements that can be arranged next to each other in a row.

A connecting device can also comprise an angled rail element and thus serve to fasten wall elements for two or more bare walls. Such an angled rail element can, for example, be a bent part made from a metal sheet that is manufacturable in a simple and cost-effective manner.

A rail element can be designed with a T-shaped profile. The profile is preferably designed L-shaped and the connecting device comprises only a first and a second leg. The length of the first and/or second leg is, in particular, smaller than the length of the rail element.

With the connecting device, an interface is made available for mounting the wall elements that can be attached to the bare ceiling early, not during mounting of the bare wall, doesn't disrupt in the mounting of the bare walls and permits the wall elements to be able to be attached only at a later mounting instant, whereby the risk of damage to the wall elements during mounting is reduced. The connecting device is additionally an interface for the mounting of the wall elements that is independent of the design of the wall, for example of whether a service panel is provided on the wall element.

Wall elements with or without functional elements can thus be mounted in the same manner and/or bare walls with or without functional elements can be covered in the same way.

According to the invention, the mounting surface comprises at least a first hole for suspending a wall element. The connecting device can thus ensure that a wall element is suspended from the bare ceiling of the elevator car.

The wall element comprises at least one suspension element at an edge which faces upwardly in the mounted state for engaging into a first hole of the connecting device.

In an alternative variant of the elevator car, the wall element in the mounted state comprises at least a first hole on its edge that faces upwardly in the mounted state and the mounting surface of the connecting device has at least one suspension element for engaging into the first hole of the wall element. The wall element can then be suspended from the suspension element of the connecting device.

Advantageously, the mounting surface comprises at least a second hole for receiving a fastening element for connecting with the wall element, which is preferably arranged below the first hole for suspending the wall element.

The second hole is preferably provided with a female thread so that a screw can engage in the hole.

A wall element can thus preferably be suspended from the connecting device and then affixed by means of a fastening element. A screw, a rivet, a toggle bolt and/or a cavity anchor can be provided as a fastening element.

The second leg of the connecting device can comprise tabs that are designed as mounting surfaces. The tabs face farther away from the contact point of the leg than the remainder of the second leg. The tabs thus form an enlarged bearing surface and offer space for first and/or second holes. Tabs can be provided, on which only a first or only a second hole is arranged or a plurality of second holes can be provided for each first hole. Preferably, a second hole is provided for each first hole.

The first leg can be permanently joined to the bare ceiling, for example glued or welded. The first leg preferably comprises at least a third hole for receiving a fastening element for connecting with the bare ceiling. The first leg can be firmly riveted to the bare ceiling, for example, or screwed onto the bare ceiling.

The third hole is preferably provided with an internal thread. A screw can then be guided through a hole in the bare ceiling and engage the third hole. In this manner, the connecting device can be mounted to the bare ceiling from outside, in particular from a region above the bare ceiling.

The first hole can be designed as a cavity or as a groove. It is preferably executed as a slot that has a horizontal orientation in the mounted state. The first hole then offers a bearing edge, upon which the wall element can be sufficiently stabilized. Simultaneously, the bearing edge helps to align the wall element horizontally. This is especially significant if a plurality of wall elements are to be attached parallel adjacent to each other. The more precisely rectangular wall elements are aligned horizontally, the better their vertical edges fit together. The length of the slot defines the size of the bearing edge; the width of the slot provides a guide for suspending the wall element.

The object can also be achieved by the use of a connecting device as described above for connecting at least one wall element with a bare ceiling of an elevator car.

The suspension element of the wall element is designed in particular as an angle, wherein one leg preferably runs vertically upward and from its end facing away from the plate a further leg to be aligned essentially horizontal faces in the direction of the bare wall to be covered. The additional leg offers a suspension surface facing downward. The legs enclose an angle of approximately 90 degrees, for example. The legs in the mounted state can also easily face downward.

The length of the additional leg can be designed so that, given a specified position of the connecting device, a specific distance of the wall element to the bare wall is defined if, for example, the additional leg in the mounted state comes into abutment against the bare wall.

The suspension element arranged on the edge which faces upwardly is typically visible from the interior of the elevator car during the mounting. The suspension element with the associated hole can be brought into alignment during mounting, wherein the process is observable by the installer. The installer is thus not dependent upon only sensing the contact of the suspension element and the corresponding hole. This simplifies the mounting.

The wall element preferably has a plurality of suspension elements so that during suspension not only a mounting but also an orientation with respect to the horizontal and the level of the bare wall is carried out.

In an advantageous embodiment, the suspension element has a hole for accommodating a fastening element for connecting with a second leg of the connecting device. The hole is preferably arranged so that it aligns with a corresponding second hole in the connecting device if the wall element is suspended. The vertical distance between the suspension surface of the additional leg and the hole of the suspension element here corresponds, for example, to the vertical distance between the bearing edge of the first hole and the second hole in the second leg of the connecting device. A screw can, for example, be guided through the hole of the suspension element, which engages in the internal thread in the second hole of the connecting device. A wall element can thus first be positioned via suspension of the suspension element and secured with a fastening element in a second step, whereby the position is kept and the suspension element, for example, does not slip or pop out. The suspension element can thereby be brought to rest on the connecting device so that the position of the second leg of the connecting device defines the distance of the suspension element and thus of the wall element from the bare wall.

The suspension element can be connected with a wall plate; for example, an angle can be screwed, soldered or welded onto a plate. In an advantageous embodiment, the wall element comprises a plate with one or more integrated suspension elements. The plate can be made from a metal, for example. A decorative surfacing can be applied to the surface of the plate facing the interior of the elevator car, for example a film or a mirror. The plate preferably has lateral edges configured at an angle.

The gap between adjacent wall elements should be as narrow as possible and the gap width should remain the same along the length of the wall elements as much as possible. The angled lateral edges allow adjacent wall elements to abut one another edge to edge. In addition, a defined shadow edge results with respect to adjacent wall plates or to another adjacent wall element, for example a part of the bare wall. The angled region can be designed so that a defined distance from the plate surface to the bare wall results along the length of the angled region. The angled region can thus provide for a planar orientation of the wall element with respect to the bare wall.

The wall element can comprise a stiffening layer that is applied to the side of the plate toward the bare wall of the car. The stiffening layer can contribute to the stability of the wall element, to noise protection and/or to insulation. An appropriate material can be selected depending upon the task.

In addition, the wall element can have at least one suspension profile that is attached to the side of the wall element facing the bare wall of the car. Using the suspension profile, the wall element can be mounted at an additional place so that is does not hang freely from the bare ceiling along its entire length. A plurality of suspension profiles can also be provided that are arranged above each other.

Preferably, a counterpart is attached to the bare wall for each suspension profile in such a manner that, during the mounting, the initial positioning is specified by the suspension elements and the connecting device, and during the suspension of the suspension elements the suspension profile can couple to the counterpart even without tactile inspection.

The suspension profile can be designed as hooks or clips; however, is preferably designed as an angle strip that extends essentially over the width of the wall element.

A wall element arrangement comprises at least one connecting device as described above and at least one wall element as described above.

Wall element arrangements can be selectable from a modular system that comprises, for example, connecting devices with rails of different length and wall elements of different width and/or length and/or wall elements with different decoration, so that a desired wall element arrangement can be produced for a specified shell. With a modular system of this type, existing elevator cars can also be equipped easily with a new interior paneling.

The wall elements are thus preferably arranged on the interior of the bare walls and produce the wall paneling visible for the passenger from the inside of the elevator car.

Advantageously, the elevator car comprises at least one wall support that is applied to a bare wall. The wall support can be a spacer that facilitates a planar orientation of the wall elements. The wall support preferably serves to cooperate with a suspension profile of a wall element and thus contributes to the fastening of the wall elements. The wall support is designed in particular as a clip strip.

The wall support is preferably attached in such a way that, when the wall element is suspended in the connecting device, the suspension profile cooperates with the wall support; for example, an angle strip is pushed into a clip strip. The distance between the bare ceiling or connecting device, and the wall support on the one hand, and the distance between the suspension element and the suspension profile, on the other, corresponds to this. A plurality of suspension elements and wall supports that are arranged one over the other, for example, can also be provided for each wall element. The clip strip preferably has a spring-loaded clip profile with which the wall element is held on the bare wall.

The elevator car can have a ceiling paneling that covers the connecting device. The ceiling paneling can comprise an angled edge region for this purpose that in the mounted state extends downwardly. The ceiling paneling can be designed so that it also covers the suspension element of a mounted wall element. The ceiling paneling is typically attached after the mounting of the wall elements. The wall elements can thus be mounted with visual inspection without there being a visual impairment in the final installation state, because the connecting device and the suspension elements are not yet covered.

The task is further achieved by a method for connecting at least one wall element with a shell of an elevator car comprising the steps: First, at least one connecting device as described above is secured to the bare ceiling of an elevator car. Afterward, at least one wall element as described above is mounted, in particular by the suspension of at least one suspension element on the connecting device.

The connecting device here comprises at least one rail element with two legs, of which a first leg is attached to the bare ceiling. A second leg has at least one mounting surface for a wall element.

The mounting surface has at least one first hole for suspending the wall element. Alternatively, the mounting surface has at least one suspension element.

The wall element has at least one suspension element at an edge which faces upwardly in the mounted state for engaging into the first hole of the connecting device. The suspension element is designed as an angle, in particular. Alternatively, the wall element comprises at least a first hole at an edge which faces upwardly in the mounted state for engaging into the first hole of the connecting device.

The mounting of at least one wall element is accomplished in that the suspension element of the wall element is suspended in the first hole of the connecting device or the first hole of the wall element is suspended on the suspension element of the connecting device.

At the same time as the suspension, one or more suspension profiles of the wall element are brought into functional connection with one or more wall supports on the bare wall, for example, suspended.

In addition, fastening elements attached to the downward facing edges of the wall element can be connected to counterparts attached to the bare wall or to the subfloor of the elevator car. A ceiling paneling can then be attached.

DESCRIPTION OF THE DRAWINGS

The invention is explained below in exemplary embodiments in reference to the accompanying drawings. Corresponding elements are provided with identical reference characters. Shown are.

DETAILED DESCRIPTION

Figure 1:
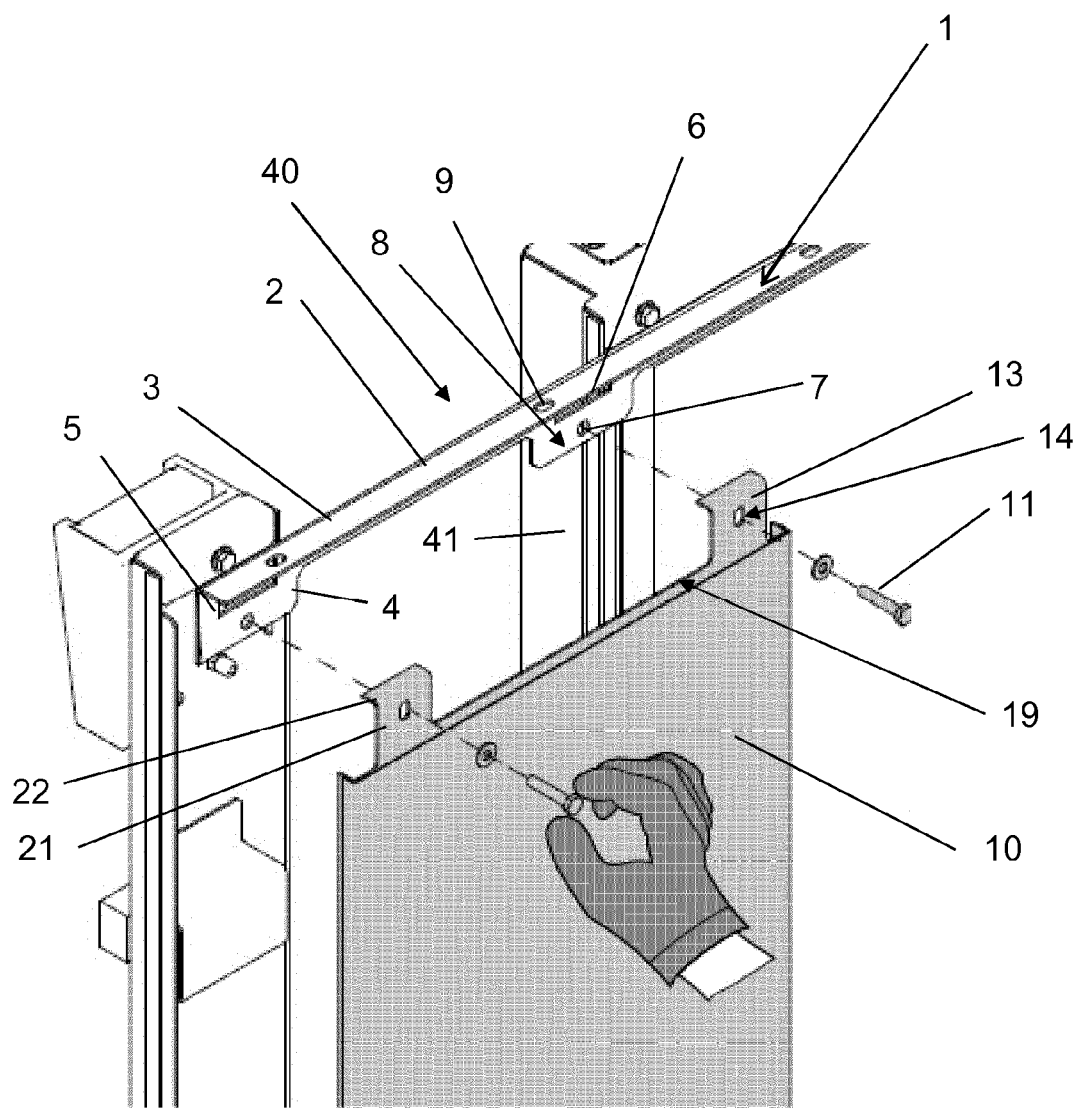
FIG. 1 is a perspective view of a connecting device and a wall element.
Figure 2:
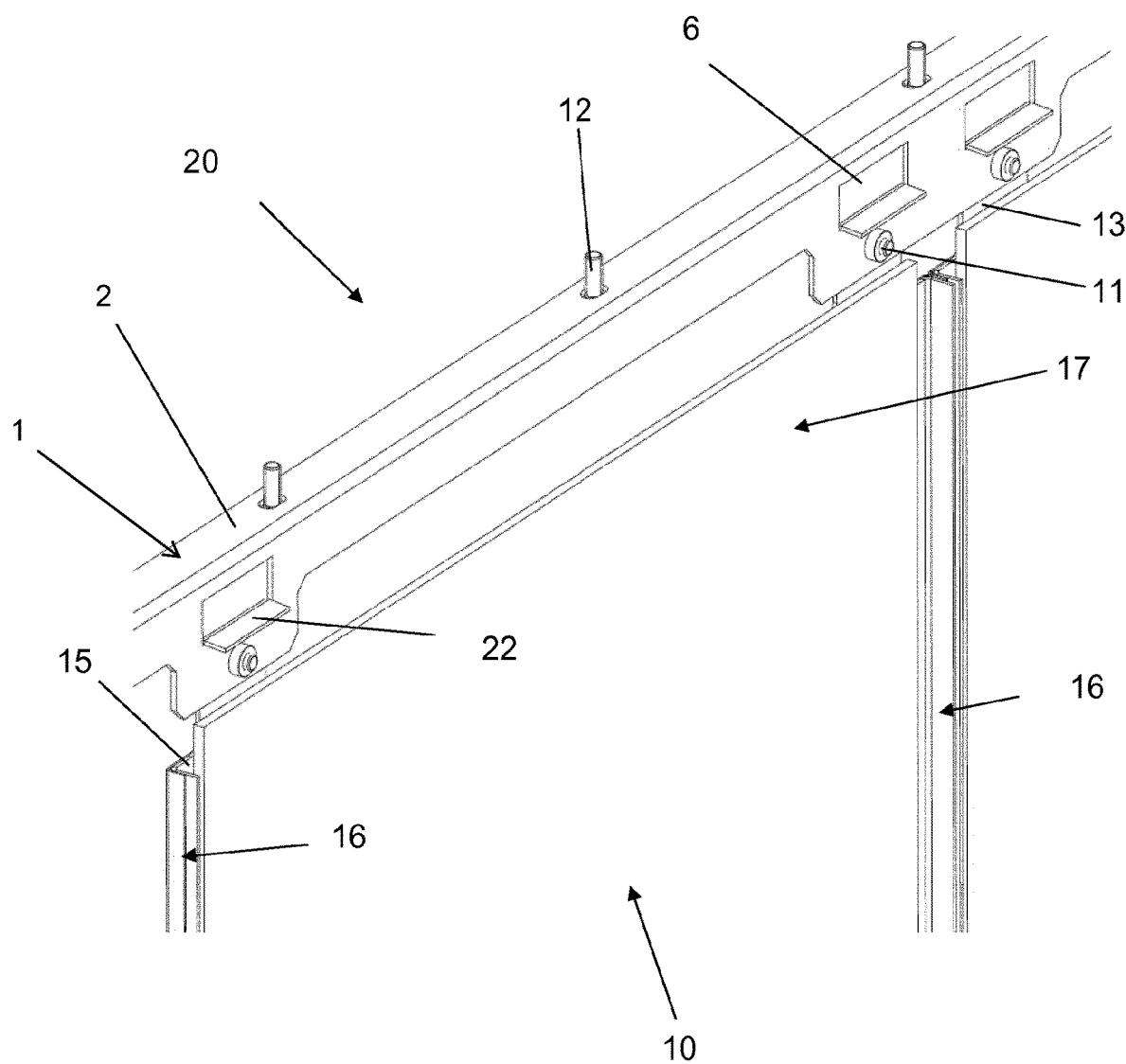
FIG. 2 is a perspective view of a wall element of a wall element arrangement seen from a bare wall.
Figure 3:
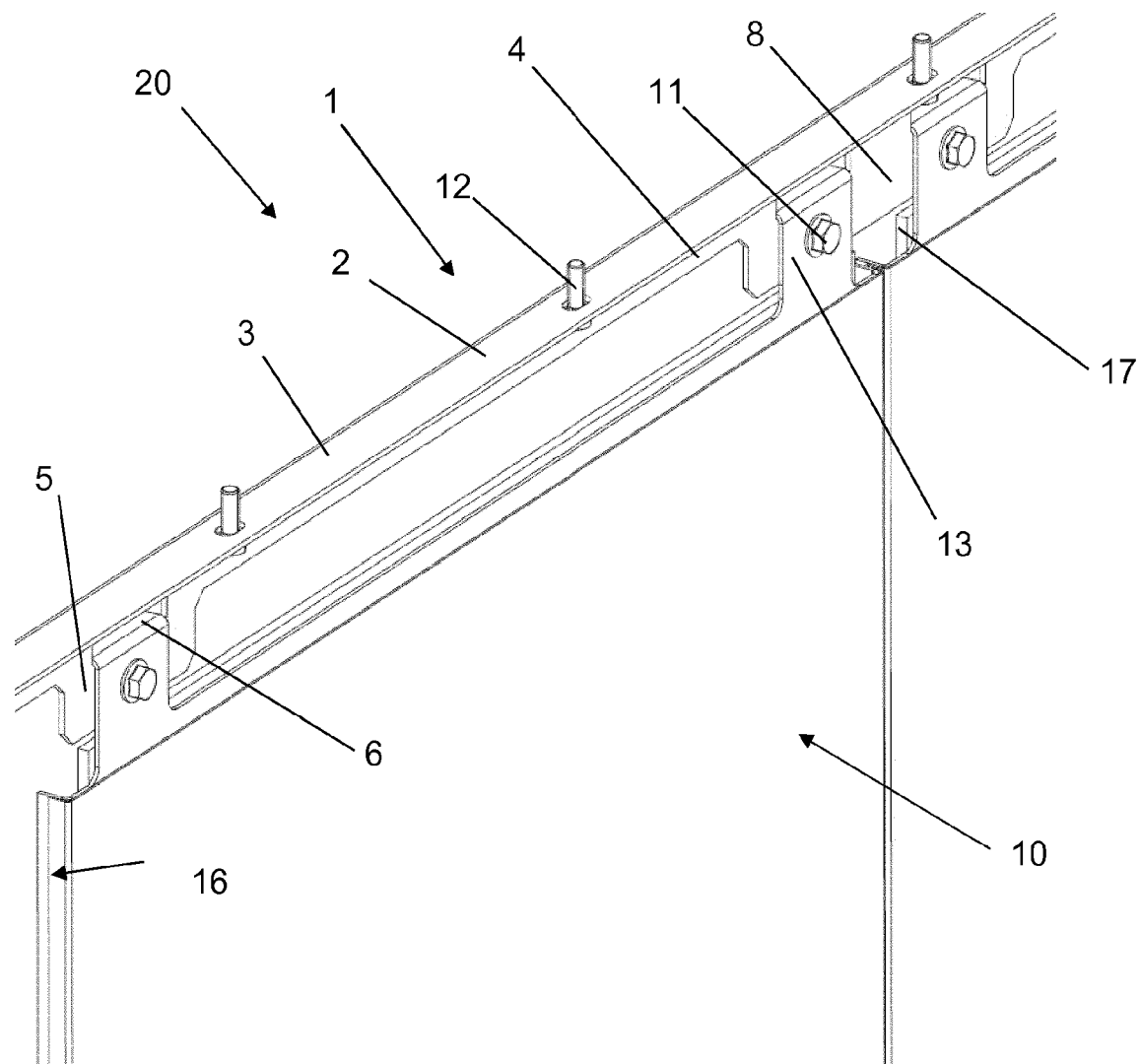
FIG. 3 is a perspective view of a wall element arrangement seen from the interior of the elevator car.
Figure 4:
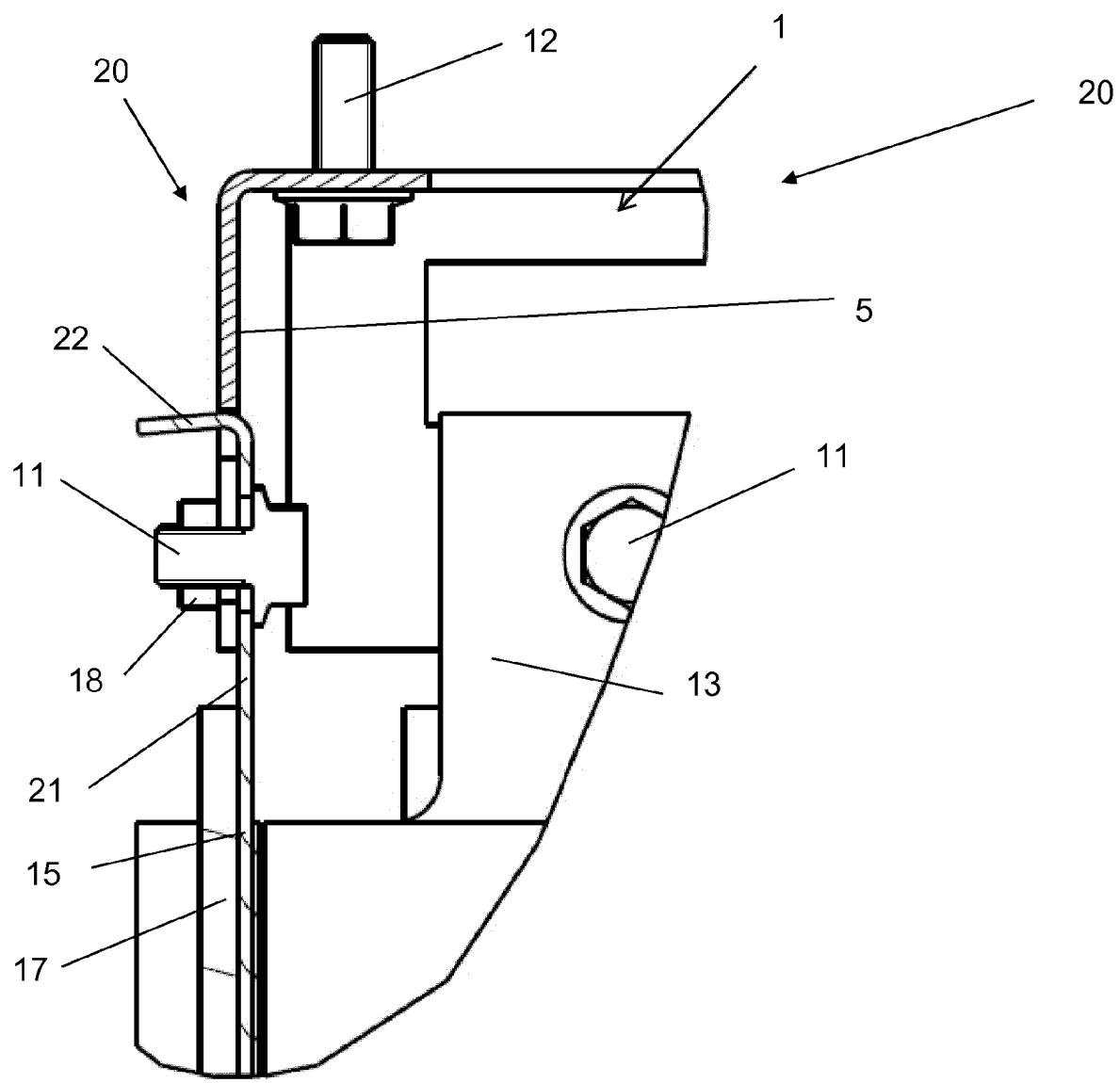
FIG. 4 is a detailed view of two wall element arrangements in sectional and top view.

FIG. 1 shows a perspective view of a connecting device 1 and a wall element 10, before the wall element 10 is suspended. FIGS. 2 and 3 show perspective views of a wall element arrangement 20 with connecting device 1 and suspended wall element 10. FIG. 4 shows a detailed view of two wall element arrangements 20 in sectional and top view.

The wall element 10 in the mounted state covers the bare wall 40 of an elevator car that is formed, for example, from a frame construction 41. The connecting device 1 comprises a rail element 2 with a first leg 3 and a second leg 4. The second leg 4 has, for example, tabs 8 that are designed as mounting surfaces 5 for a wall element 10.

The mounting surface 5 has first holes 6 for suspending a wall element 10 and second holes 7 for accommodating a fastening element 11 for connecting with the wall element 10. The second holes 7 are provided with an internal thread 18, for example. The first leg 3 comprises third holes 9 for receiving a fastening element 12 for connecting with the bare ceiling. The first leg 3 preferably faces away from the bare wall 40, so that the connecting device 1 can be mounted from the interior of the elevator car outward (see also FIGS. 5a, 5b).

The wall element 10 has suspension elements 13 at an edge 19 which faces upwardly in the mounted state for engaging into the first hole 6 of the connecting device 1. A suspension element 13 preferably comprises a vertical leg 21, from which a horizontal leg 22 extends outwardly in the direction of the bare wall 40. The horizontal legs 22 can be pushed easily into the first holes 6 during the mounting of the wall element 10 until they abut the mounting surface 5, wherein the wall element 10 is positioned and aligned.

In addition, the suspension element 13 preferably has holes 14 for receiving a fastening element 11, in this case a screw, with which the wall element 10 can be screwed to the connecting device 1. The fastening elements 11 are guided through the holes 14 in the suspension element and through the holes 7 in the second leg 4 of the connecting device 1, wherein they engage in the interior threads 18.

The wall elements 10 can comprise a plate 15 with integrated suspension elements 13. The plates 15 preferably have lateral edges 16 formed at an angle that face the bare wall 40. The angled lateral edges 16 of adjacent plates 15 in the mounted state rest approximately adjacent to each other. The wall elements 10 can comprise a stiffening layer 17 that is applied to the side of plate 15 facing toward the bare wall 40 of the car.

Figure 5A:
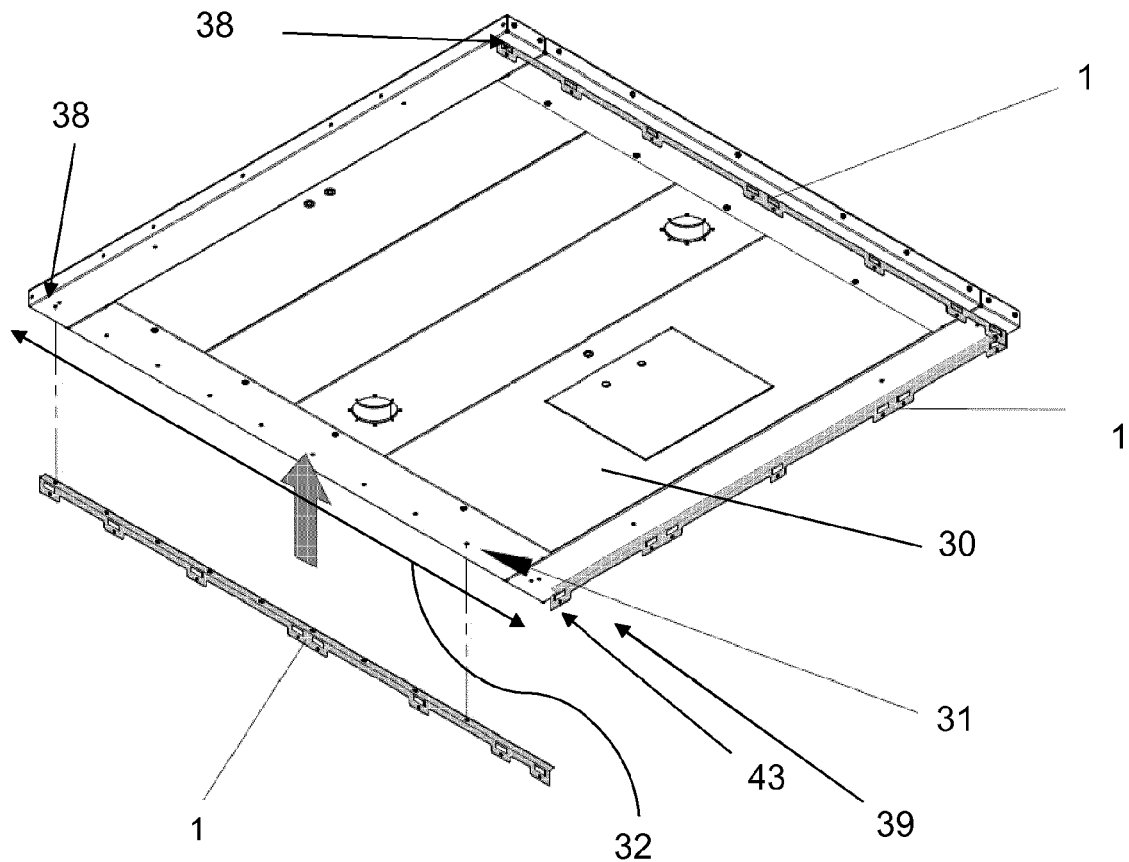
FIG. 5a is a perspective view of a bare ceiling with a connecting device seen from the interior of the elevator car.
Figure 5B:
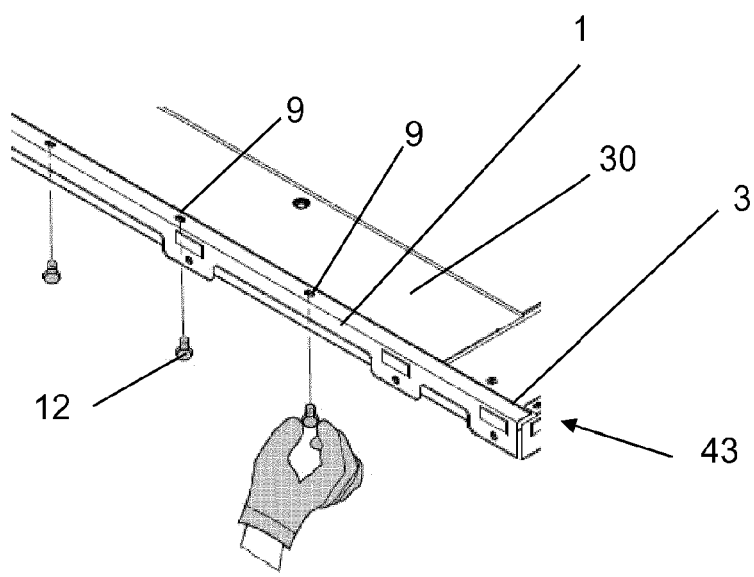
FIG. 5b is an additional perspective view of a bare ceiling with connecting device seen from the interior of the elevator car.

FIG. 5a shows a perspective view of a bare ceiling 30 with connecting device 1 seen from the interior of the elevator car and FIG. 5b shows a detailed view of it. The connecting device 1 is arranged on the bare ceiling 30 from below until the first leg 3 rests on the bare ceiling 30. Threaded holes 31 are provided in the bare ceiling 30, for example, that align with the holes 9 in the first leg 3. The connecting device 1 can then be screwed to the bare ceiling 30 from the interior of the elevator car with fastening elements 12, in this case screws. For each of the three bare walls 40 that have no elevator door, each is provided with one connecting device 1, in particular, that extends across the width 32 of the bare wall 40, or bare ceiling 30 and can respectively receive a plurality of wall elements 10.

The connecting devices 1 extend into the corners 38 of the bare ceiling 30. The connecting devices 1 have in particular holes 43 at one end 39 in which the first leg 3 of the next connection device 1 is located in the mounted state.

Figure 6:
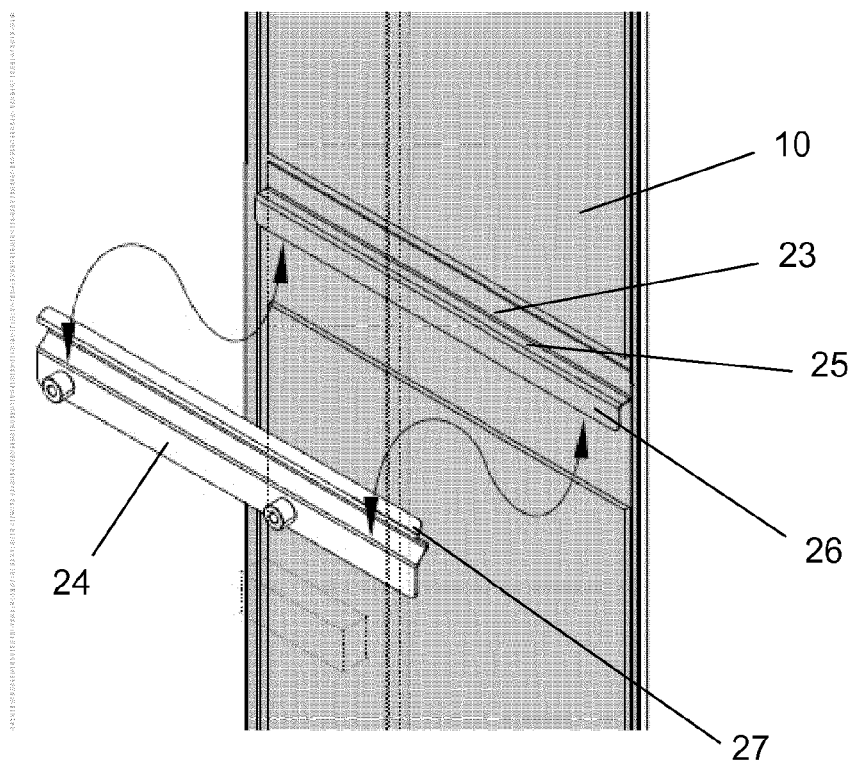
FIG. 6 is a schematic representation of a wall element with a suspension profile and a wall support.

FIG. 6 shows a schematic representation of an example of a wall element 10 with a suspension profile 23 and a wall support 24. The wall elements 10 have suspension profiles 23 that are applied to the side of the wall elements 10 facing a bare wall 40 of an elevator car. The suspension profiles 23 are formed as angle strips with a horizontal leg strip 25 and a vertical leg strip 26.

During mounting, the vertical leg strip 26 pushes behind the clip profile 27 of a wall support 24 attached to the bare wall 40. Finally, the horizontal leg strip 25 remains on the clip profile 27. The wall elements 10 thus hang on the connecting devices 1 and on the wall supports 24.

Figure 7A:
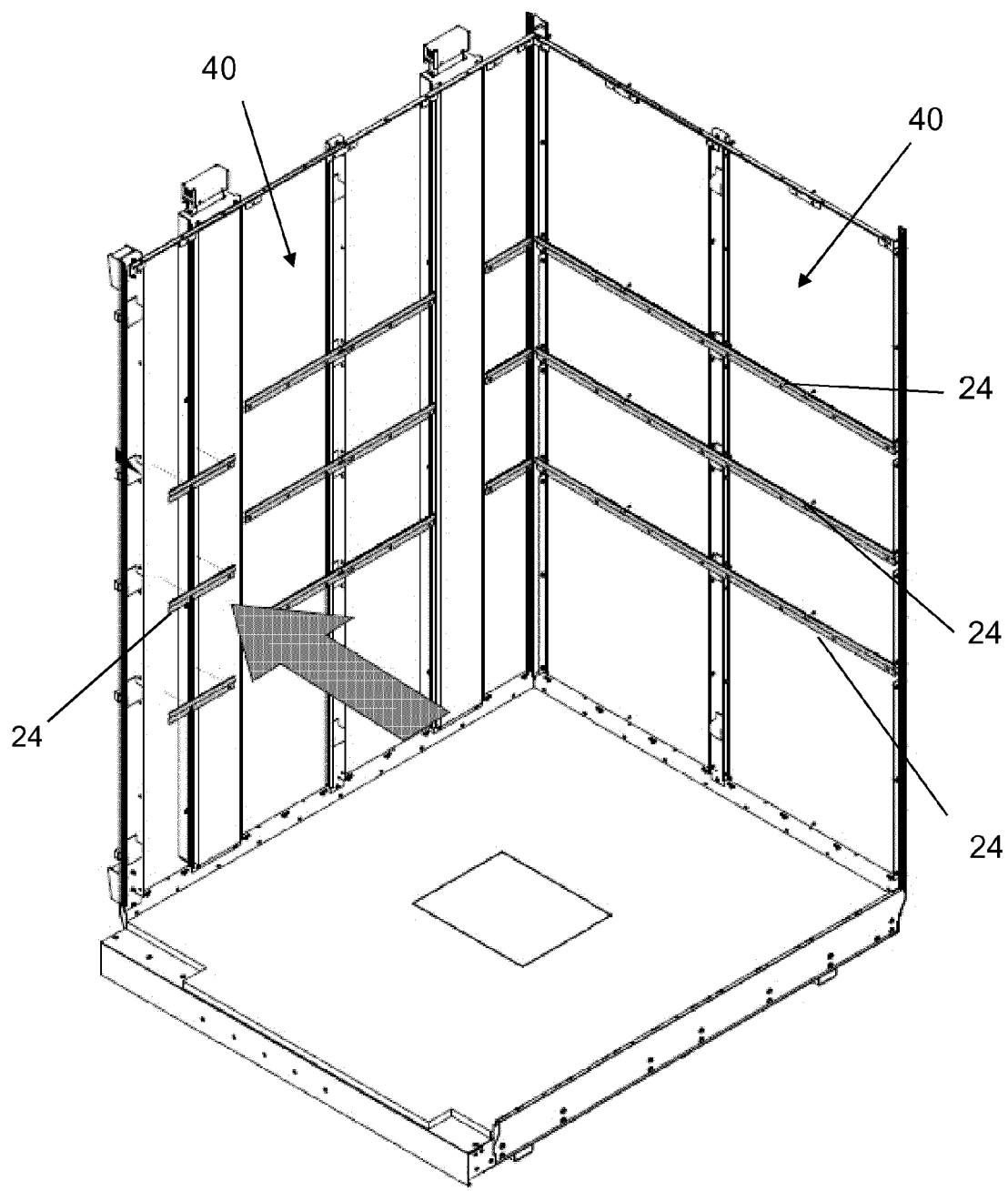
FIG. 7a is a perspective view of two bare walls with wall supports seen from the interior of the elevator car.
Figure 7B:
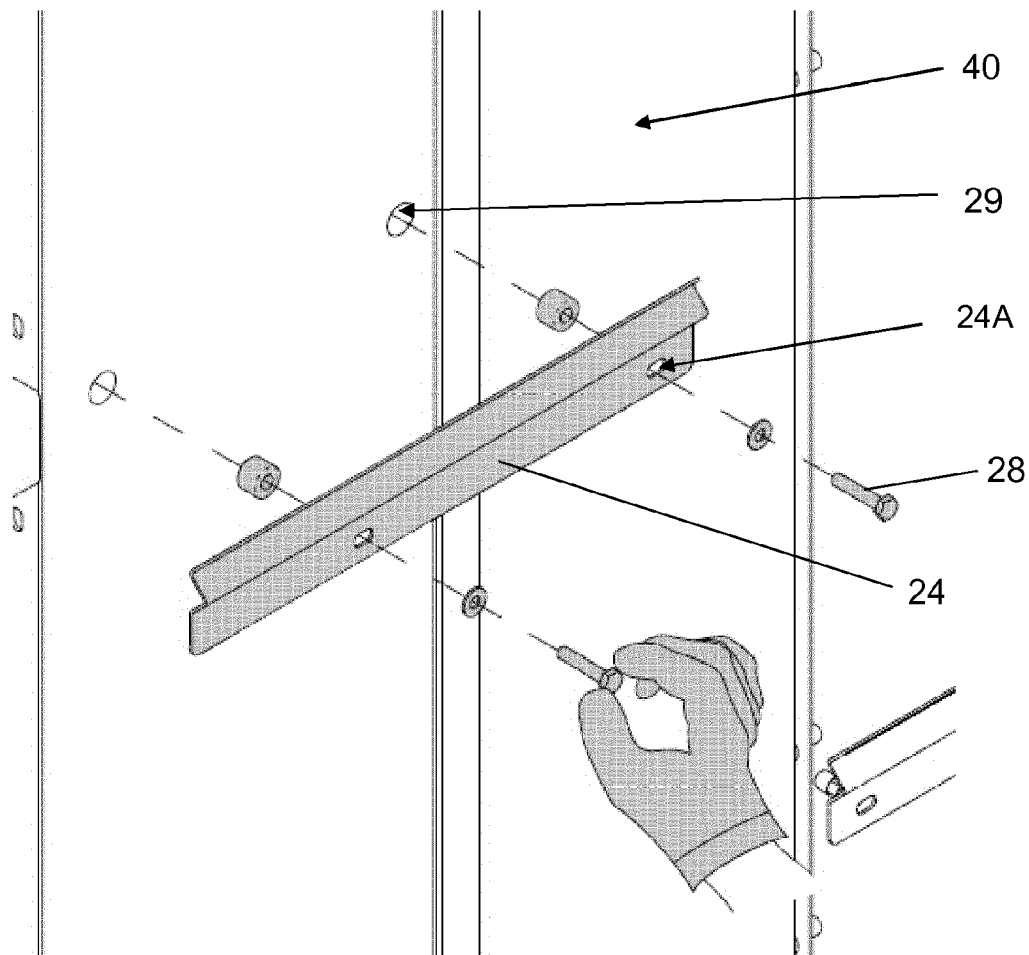
FIG. 7b is an additional perspective view of a bare wall with wall supports seen from the interior of the elevator car.

FIG. 7a shows a perspective view of examples of two bare walls 40 with wall supports 24, in this case clip strips, seen from the interior of the elevator car. FIG. 7b shows a detail of this. The wall supports 24, in this case clip strips, have holes 24A for receiving screws 28. The holes 24A correspond to holes 29 that are provided in the bare walls 40 and have an internal thread. By means of the screws 28, the wall supports 24, in this case clip strips, can be screwed firmly to the bare walls 40, meaning from the interior of the elevator car. The direction of installation of the wall supports 24 is indicated by the large arrow in FIG. 7a.

Figure 8:
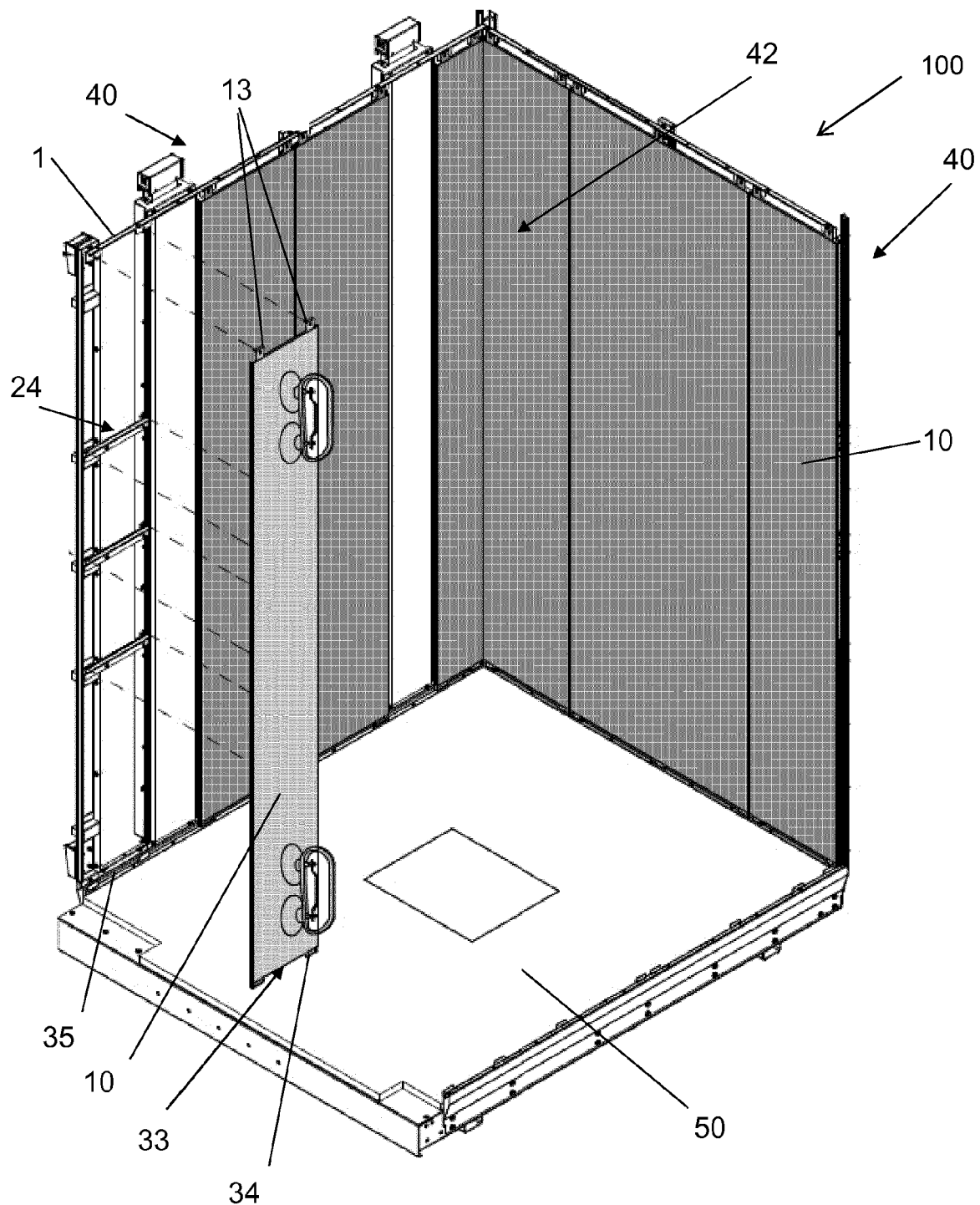
FIG. 8 is a schematic view of an interior of an elevator car.

FIG. 8 shows a schematic view of an example for an interior 42 of an elevator car indicated in this case with 100. Shown are two bare walls 40 and a subfloor 50. The bare walls 40 are covered with wall elements 10. The wall elements 10 are attached to the bare walls 40 from the interior of the elevator car 100, suspended with suspension elements 13 in a connecting device 1 and suspended with suspension profiles 23 on wall supports 24.

The wall elements 10 can have fastening tabs 34 on their lower edges 33 facing the subfloor 50, with which they can be secured to a fastening tab 35 provided on the subfloor 50. The fastening tabs 34 can have holes not explicitly shown and the fastening strip 35 can have holes not explicitly shown with internal threads so that the wall elements 10 can also be screwed firmly to the lower edge 33.

Figure 9:
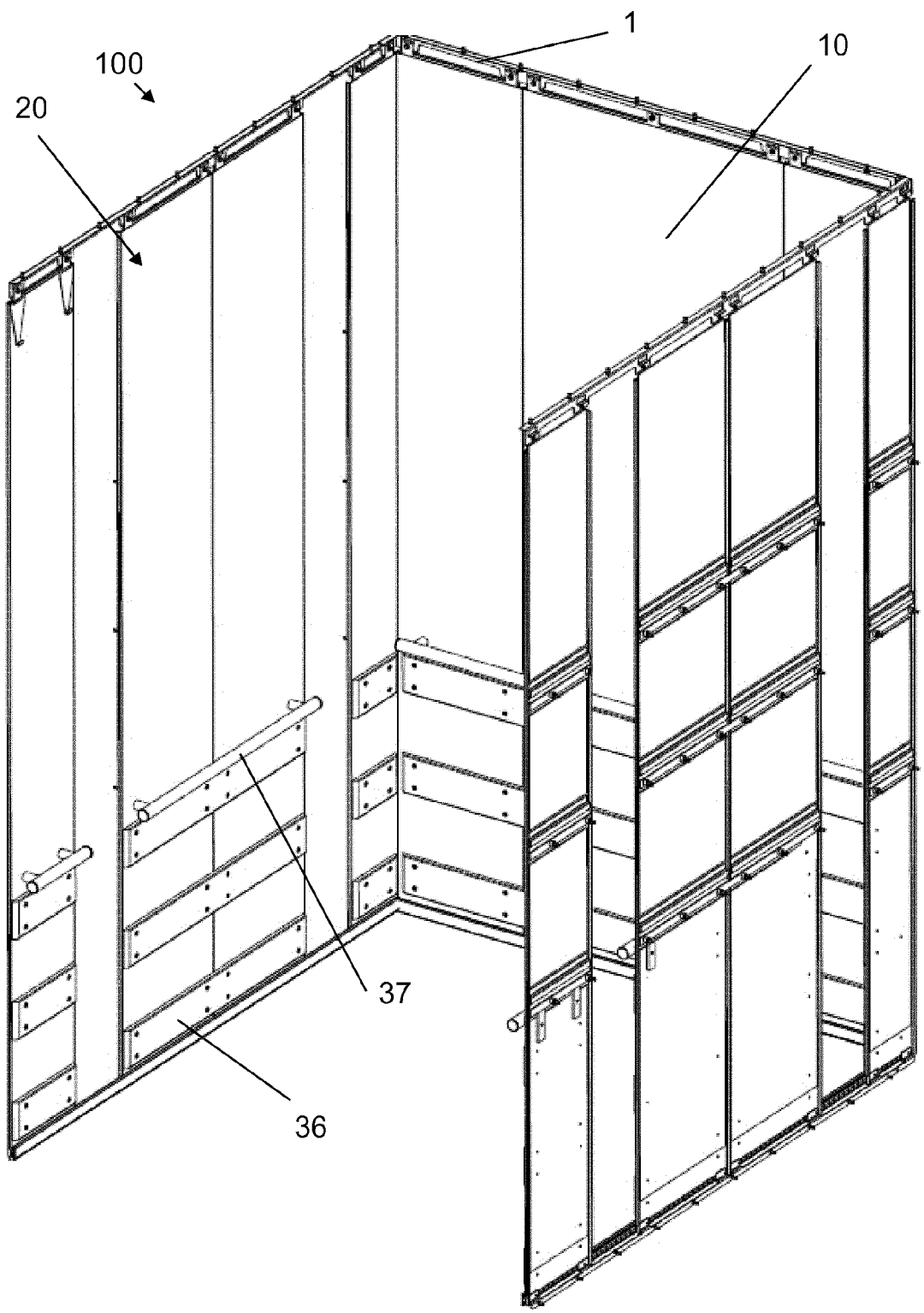
FIG. 9 is a perspective view of wall element arrangements.

FIG. 9 shows a perspective view of examples of wall element arrangements 20. The wall element arrangements 20 comprise connecting devices 1 and wall elements 10. Protective strips 36 and hand rails 37 can also be mounted on the mounted wall elements 10.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator car with a bare ceiling, a wall element and a connecting device for connecting the wall element to the bare ceiling, the connecting device comprising:
   a rail element with a first leg that bears against the bare ceiling when the connecting device is in a mounted state in the elevator car and a second leg having a mounting surface for the wall element; and
   wherein the mounting surface has a first hole for suspending the wall element, wherein the wall element includes a suspension element formed as an angle at an edge of the wall element, which suspension element faces upwardly in the mounted state for engaging into the first hole, or
   wherein the wall element has a first hole at an edge that faces upwardly in the mounted state and the mounting surface includes a suspension element for engaging into the first hole.

2. The elevator car according to claim 1 wherein the elevator car includes a fastening element, wherein the mounting surface has a second hole for receiving the fastening element for connecting to the wall element, wherein the second hole is provided with an internal thread for engaging the fastening element.

3. The elevator car according to claim 1 wherein the second leg of the rail element includes a tab that forms the mounting surface.

4. The elevator car according to claim 1 wherein the elevator car has a fastening element, wherein the first leg of the rail element has another hole for receiving the fastening element for connecting with the bare ceiling, wherein the another hole is provided with an internal thread.

5. The elevator car according to claim 1 wherein the first hole is formed as a slot that in the mounted state has a horizontal alignment.

6. The elevator car according to claim 1 including a fastening element, wherein the suspension element has a hole for receiving the fastening element for connecting with the second leg of the rail element.

7. The elevator car according to claim 1 wherein the wall element includes a plate with lateral edges formed at an angle and the suspension element integrated with the plate.

8. The elevator car according to claim 1 wherein the elevator car includes a one bare wall, and wherein the wall element includes a plate and a stiffening layer applied to a side of the plate facing toward the bare wall in the mounted state.

9. The elevator car according to claim 1 wherein the elevator car includes a bare wall, and wherein the wall element has a suspension profile attached to a side of the wall element facing toward the bare wall in the mounted state.

10. The elevator car according to claim 9 wherein the elevator car includes a wall support attached to the bare wall to cooperate with the suspension profile.

11. The elevator car according to claim 10 wherein the wall support is formed as a clip strip.

12. The elevator car according to claim 1 wherein the elevator car includes a ceiling paneling that covers the connecting device in the mounted state.

13. A method for connecting a wall element with a shell of an elevator car comprising the steps of:
attaching a connecting device to a bare ceiling of the elevator car shell, wherein the connecting device includes a rail element having a first leg connected to the bare ceiling and a second leg having a mounting surface for a wall element; and
affixing the wall element to the connecting device in a mounted state,
wherein the mounting surface includes a hole for suspending the wall element and the wall element has a suspension element formed as an angle at an edge of the wall element, which suspension element faces upwardly in the mounted state and engages into the hole to suspend the wall element from the connecting device, or
wherein the mounting surface includes a suspension element and the wall element includes a hole, wherein the suspension element engages into the hole in the mounted state to suspend the wall element from the connecting device.

* * * * *